(12) United States Patent
Boyd et al.

(10) Patent No.: US 9,146,678 B2
(45) Date of Patent: Sep. 29, 2015

(54) HIGH THROUGHPUT HARDWARE ACCELERATION USING PRE-STAGING BUFFERS

(71) Applicant: International Business Machines Corporation, Armonk, NY (US)

(72) Inventors: William T. Boyd, Poughkeepsie, NY (US); Thomas J. Heller, Jr., Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 13/872,298

(22) Filed: Apr. 29, 2013

(65) Prior Publication Data

US 2014/0325098 A1   Oct. 30, 2014

(51) Int. Cl.
*G06F 3/06* (2006.01)
*G06F 13/00* (2006.01)
*H04L 12/861* (2013.01)

(52) U.S. Cl.
CPC  *G06F 3/06* (2013.01); *G06F 3/061* (2013.01); *G06F 3/0656* (2013.01); *G06F 3/0683* (2013.01); *G06F 13/00* (2013.01); *H04L 49/90* (2013.01)

(58) Field of Classification Search
CPC ......... G06F 3/06; G06F 3/061; G06F 3/0683; G06F 3/0656; G06F 13/00; H04L 49/90
USPC ............................................... 710/22, 26, 52
See application file for complete search history.

(56) References Cited

U.S. PATENT DOCUMENTS

| | | | | |
|---|---|---|---|---|
| 6,105,075 | A * | 8/2000 | Ghaffari | 710/5 |
| 6,449,697 | B1 * | 9/2002 | Beardsley et al. | 711/137 |
| 6,886,171 | B2 * | 4/2005 | MacLeod | 719/324 |
| 8,010,718 | B2 | 8/2011 | Archer et al. | |
| 8,321,633 | B2 * | 11/2012 | Kim | 711/138 |
| 8,626,964 | B2 * | 1/2014 | Dimond | 710/22 |
| 2006/0168365 | A1 * | 7/2006 | Martinez et al. | 710/22 |
| 2011/0145447 | A1 | 6/2011 | Dimond | |
| 2012/0030421 | A1 | 2/2012 | Chang et al. | |
| 2012/0158682 | A1 * | 6/2012 | Yarnell et al. | 707/704 |

* cited by examiner

*Primary Examiner* — Eric Oberly
(74) *Attorney, Agent, or Firm* — Cantor Colburn LLP; Margaret McNamara

(57) ABSTRACT

Embodiments relate to providing high throughput hardware acceleration. Aspects include initializing an accelerator control queue (ACQ) configured to provide location information on a plurality of pages of data identified as accelerator data. An originating location of each page of requested target data is determined. The originating location includes one of system memory and disk storage. Based on determining that the originating location is system memory, an entry is created in the ACQ mapping to a system memory source address for the target data. Based on determining that the originating location is disk storage, an entry is created in the ACQ mapping to a special pre-stage buffer source address of a special pre-stage buffer for the target data. Each page of the plurality of pages of target data is accessed by the accelerator from respective locations in said memory or said special pre-stage buffer, based on respective entries of the ACQ.

19 Claims, 5 Drawing Sheets

US 9,146,678 B2

HIGH THROUGHPUT HARDWARE ACCELERATION USING PRE-STAGING BUFFERS

BACKGROUND

The present invention relates generally to hardware accelerators, and more specifically, to providing high throughput hardware acceleration using speed-matching special pre-stage buffers.

Contemporary computing systems are designed to process database queries and software algorithms requiring access to large amounts of data located on system memory or disk storage. To process database queries requiring access to large amounts of data, contemporary computing systems typically use data from a particular point in time, or a "snapshot" of the real time data used in an online transaction processing (OLTP) database systems. Further, when the required data bandwidth is available, contemporary computing systems often provide hardware accelerators to off-load some of the processing from expensive coherent memory multiprocessors to less expensive or more efficient hardware accelerators.

SUMMARY

Embodiments include a method, system, and computer program product for providing high throughput hardware acceleration. Aspects include initializing an accelerator control queue (ACQ) configured to provide location information on a plurality of pages of data identified as accelerator data. A request for a target data, which spans a plurality of pages, is received from a software application and an originating location of each page of the target data is determined. The originating location includes at least one of a system memory and a disk storage. Based on determining that the originating location is the system memory, an entry is created in the ACQ that maps to a system memory source address for the target data. Based on determining that the originating location is the disk storage, an entry is created in the ACQ that maps to a pre-stage buffer source address of a special pre-stage buffer for the target data, the special pre-stage buffer configured to pre-stage the target data from disk storage for access by an accelerator. Each page of the plurality of pages of target data is accessed by the accelerator from respective locations in said memory or said special pre-stage buffer, based on respective entries of the ACQ.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
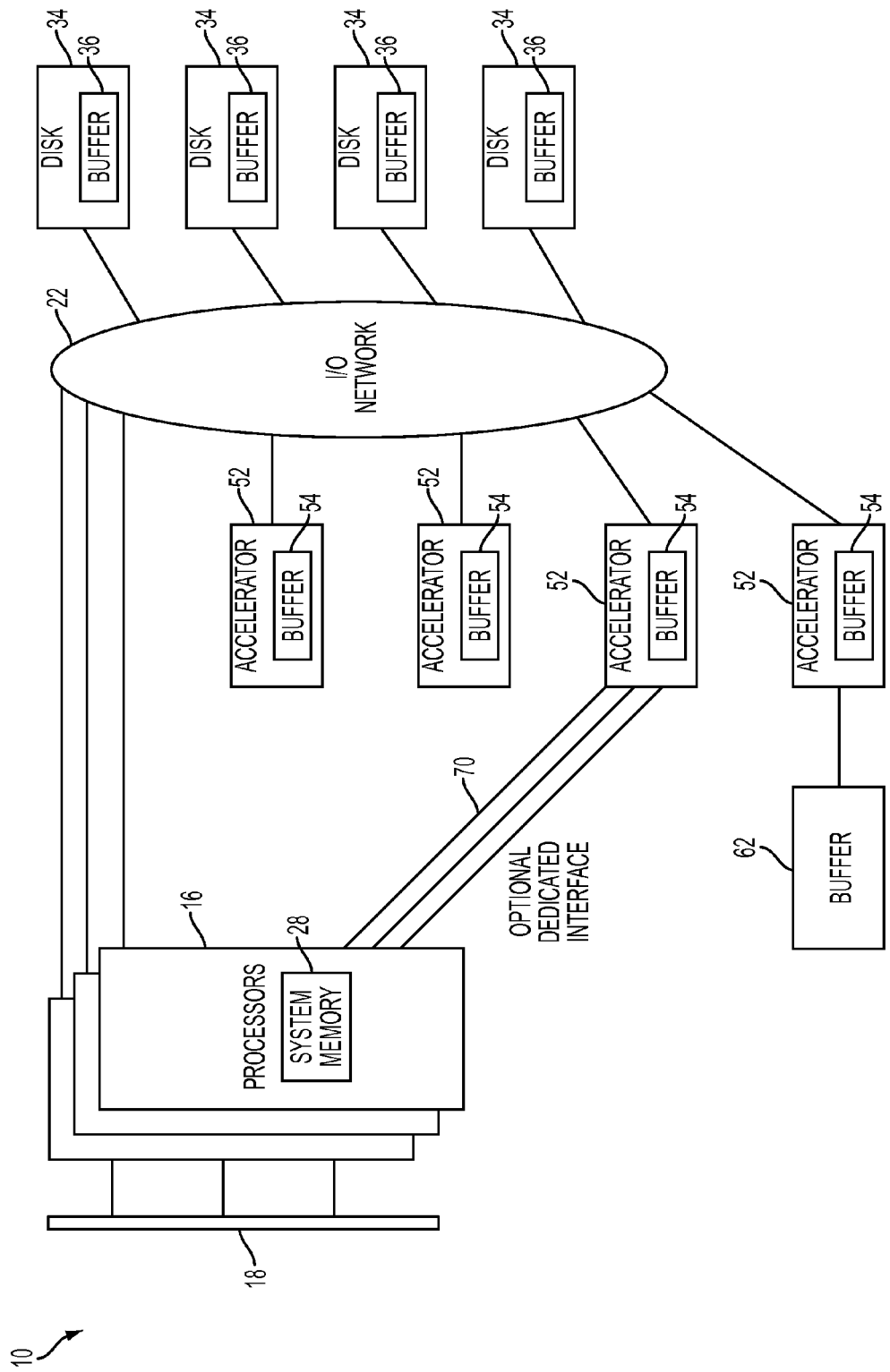
FIG. 1 depicts a block diagram of a computer system according to an embodiment.

Embodiments disclosed herein are directed to providing high throughput hardware acceleration. An aspect includes initializing an accelerator control queue (ACQ) configured to provide location information on a plurality of pages of data identified as accelerator data. A request for a target data, which spans a plurality of pages, is received from a software application and an originating location of each page of the target data is determined. The originating location includes at least one of a system memory and a disk storage. Based on determining that the originating location is the system memory, an entry is created in the ACQ that maps to a system memory source address for the target data. Based on determining that the originating location is the disk storage, an entry is created in the ACQ that maps to a pre-stage buffer source address of a special pre-stage buffer for the target data, the special pre-stage buffer configured to pre-stage the target data from disk storage for access by an accelerator. Each page of the plurality of pages of target data is accessed by the accelerator from respective locations in said memory or said special pre-stage buffer, based on respective entries of the ACQ.

Contemporary data systems typically pull all the requested data back into the system memory prior to forwarding the data to the accelerator or will simply assume that all the requested data is on disk storage and will be directly sent to the accelerator. Accordingly, contemporary data systems do not attempt to send I/O requests to disk subsystems and having those subsystems deliver some of the data to the accelerator directly while having other data come from system memory.

Embodiments disclosed herein provide a method, system, and computer program product for offloading data to an accelerator both from system memory and disk storage while preventing the accelerator from waiting on one or the other. In other words, embodiments provide speed matching by ensuring that the offloaded data is delivered continuously and without gaps to the accelerator for processing. Embodiments include a method of speed matching the delivery of data from relatively slow disk accesses to the high throughput hardware accelerators without introducing additional software complexity to user level software.

Additionally, embodiments disclosed herein provide a method, system, and computer program product to optimize available accelerators in processing the large volume of data that is found in OLTP systems. Embodiments pre-stage data from system memory and disk storage in a way that allows the target accelerator to access and process the data at maximum throughput rates. Embodiments may track the state and originating location of the required data, allowing access to pages of the data in an optimal way regardless of the location of the pages (e.g., system memory versus disk storage). Embodiments may utilize field-programmable gate arrays (FPGAs) as accelerators in conjunction with flash memory as a special pre-stage buffer to optimize the FPGA utilization. Embodiments also may reduce system data bus utilization by optimizing the flow of data from disk to flash memory and then to the FPGA avoiding the system and memory bus on all disk resident data. Moreover, embodiments may be used with any software algorithm that operates on large volumes of data and maintains a map of the data, which indicates whether the data is currently in system memory or on disk storage. Furthermore, embodiments may also be extended to operate on systems where only the operating system maintains a map of the data.

Referring now to FIG. 1, a block diagram of a computer system 10 suitable for providing high throughput hardware acceleration using speed-matching special pre-stage buffers according to exemplary embodiments is shown. Computer system 10 is only one example of a computer system and is not intended to suggest any limitation as to the scope of use or functionality of embodiments described herein. Regardless, computer system 10 is capable of being implemented and/or performing any of the functionality set forth hereinabove.

Computer system 10 is operational with numerous other general purpose or special purpose computing system environments or configurations. Examples of well-known computing systems, environments, and/or configurations that may be suitable for use with computer system 10 include, but are not limited to, personal computer systems, server computer systems, thin clients, thick clients, cellular telephones, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 10 may be described in the general context of computer system-executable instructions, such as program modules, being executed by the computer system 10. Generally, program modules may include routines, programs, objects, components, logic, data structures, and so on that perform particular tasks or implement particular abstract data types. Computer system 10 may be practiced in distributed cloud computing environments where tasks are performed by remote processing devices that are linked through a communications network. In a distributed computing environment, program modules may be located in both local and remote computer system storage media including memory storage devices.

As shown in FIG. 1, computer system 10 is shown in the form of a general-purpose computing device, also referred to as a processing device. The components of computer system may include, but are not limited to, one or more processors or processing units 16, a system memory 28, and a bus 18 that couples various system components including system memory 28 to processor 16. The processor 16 may run computer-readable program code instructions for providing high throughput hardware acceleration using speed-matching special pre-stage buffers according to an embodiment.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that is accessible by computer system 10, and it includes both volatile and non-volatile media, removable and non-removable media. System memory 28 may include computer system readable media in the form of volatile memory, such as random access memory (RAM) and/or system cache. According to an embodiment, the system memory 28 may be used by the database software to create an accelerator control queue (ACQ) as discussed further below.

Computer system 10 may further include other removable/non-removable, volatile/non-volatile computer system storage media. By way of example only, storage systems 34 may be provided for reading from and writing to a non-removable, non-volatile magnetic media (not shown and typically called a "hard disk drive"). Each storage system 34 may contain a special pre-stage buffer or disk buffer 36. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces.

As will be further depicted and described below, system memory 28 may include at least one program product having a set (e.g., at least one) of program modules that are configured to carry out the functions of embodiments of the disclosure.

According to an embodiment, computer-readable program code for may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Computer-readable program code may generally carry out the functions and/or methodologies of embodiments of the invention as described herein.

Computer system 10 may also communicate with one or more external devices such as a keyboard, a pointing device, a display, etc.; one or more devices that enable a user to interact with computer system 10; and/or any devices (e.g., network card, modem, etc.) that enable computer system/server 10 to communicate with one or more other computing devices. Still yet, computer system 10 can communicate with one or more networks such as a local area network (LAN), a general wide area network (WAN), and/or a public network (e.g., the Internet). Such communication can occur via an Input/Output (I/O) network 22. As depicted, the I/O network 22 communicates with the other components of computer system 10 via bus 18. For example, according to an embodiment, an I/O network connection may be established between the processor 16 and the I/O network to allow the processor 16 to issue special I/O requests to the I/O network 22. According to another embodiment, the I/O network may also wirelessly communicate with other components of computer system 10.

Computer system 10 may further include special-purpose computer systems. These special-purpose computer systems may include hardware accelerators 52 such as FPGAs (Field-Programmable Gate Arrays), GPUs (Graphics Processing Units), and similar systems, which may be used in lieu of or in addition to general-purpose processors. Each hardware accelerator may contain a special pre-stage accelerator buffer 54, such as a flash memory, according to an embodiment. The hardware accelerators may be connected to the I/O network 22 according to an embodiment. According to an embodiment, a dedicated interface 70 may be provided between each hardware accelerator 52 and the system memory 28 to provide direct memory access (DMA) from the hardware accelerator subsystem 52 to the system memory 28 independent of the processor 16.

The computer system 10 may also provide a special pre-stage alternative buffer 62, which may be tied to an additional memory card. It should be understood that although not shown, other hardware and/or software components could be used in conjunction with computer system 10. Examples include, but are not limited to: microcode, device drivers, redundant processing units, external disk drive arrays, RAID systems, tape drives, and data archival storage systems, etc.

Figure 2:
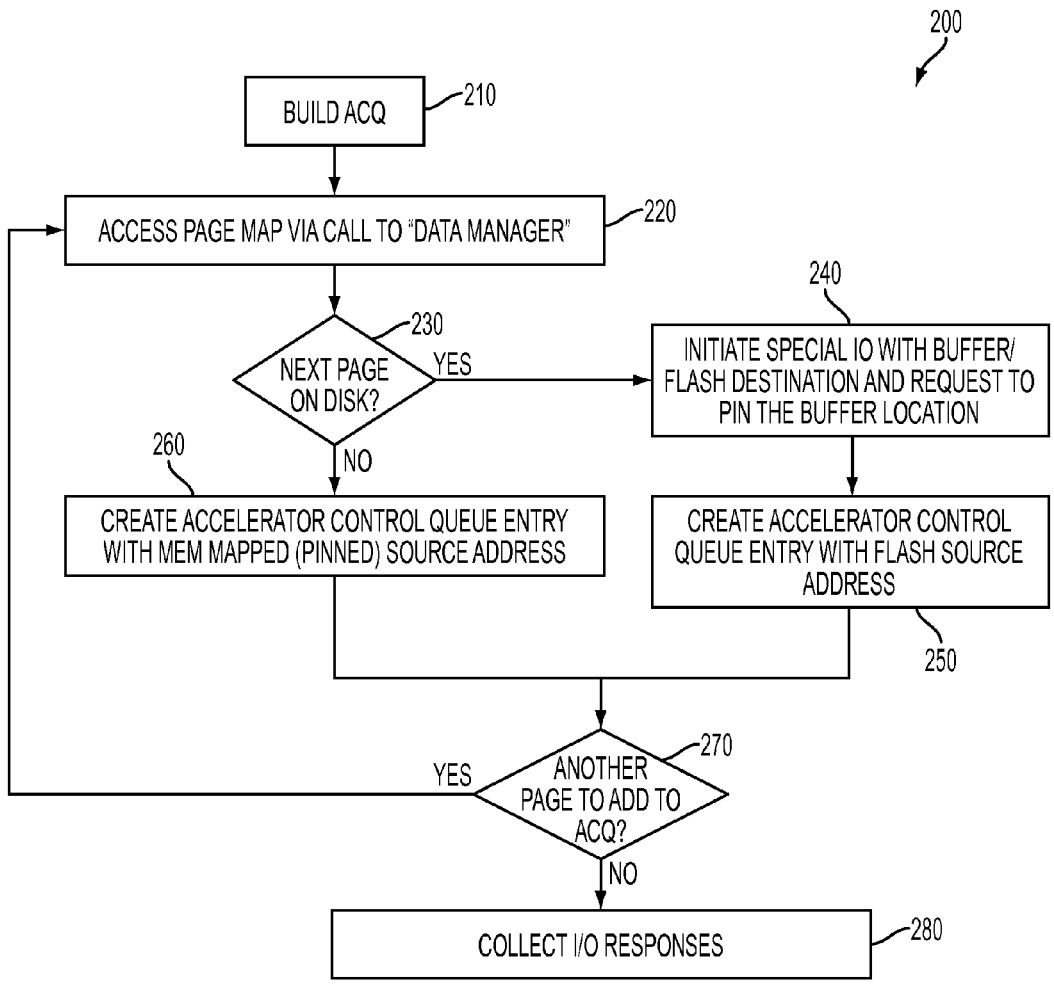
FIG. 2 depicts a flow diagram for pre-staging data from system memory and disk storage for accelerator access and processing according to an embodiment.

With reference to FIG. 2, a flow diagram of a process 200 performed by an embodiment of the processor 16 of the computer system 10 is generally shown. As shown in FIG. 2, the process 200 provides a method for pre-staging data from system memory 28 and disk storage 34 to allow a target accelerator 52 to access and process the data at maximum throughput rates.

According to an embodiment, an accelerator control queue (ACQ) may be built for pre-staging target data that requires the use of an accelerator 52, as shown in block 210. The ACQ may include entries for each page of target data that has been operated on by process 200. Each ACQ entry may include an indication of whether the page resides in system memory 28 or disk storage 34. Additionally, each ACQ entry may include a set of bits that indicate the state of I/O operations (if any) for the ACQ entry. At block 220, a page map may be accessed to determine the location of a page of the target data based on receiving a request or query for target data that requires the use of the accelerator 52. At block 230, a determination is made regarding whether the target page resides in system memory 28 or on disk storage 34.

Based on a determination that the target page resides on disk storage 34, a special I/O request to the I/O network is initiated, as shown in block 240. According to an embodiment, the special I/O request may deliver the target page directly to the accelerator 52 from the disk storage 34 or may deliver the target page to a special pre-stage buffer 36, 54, 62 for later access by the accelerator 52. According to an embodiment, the target page may be delivered to a special pre-stage buffer including one of an accelerator buffer 52, a disk buffer 36, or an alternative buffer 62. The special pre-stage buffer 36, 54, 62 is configured to pre-stage the target data for access by an accelerator according to an embodiment. This embodiment allows better utilization of the accelerator 52 as it will not have to wait for target data from the disk. A request to pin or map the location of the target page in the special pre-stage buffer 36, 54, 62 may be initiated according to an embodiment. Accordingly, at block 250, an ACQ entry may be created to map the source address of the target page in the special pre-stage buffer 36, 54, 62 for subsequent reference by the accelerator 52.

Based on a determination that the target page resides in system memory 28 at block 230, an ACQ entry may be created that maps to the source address of the target page in system memory 28 for subsequent reference by the accelerator 52, as shown in block 260. According to an embodiment, the accelerator 52 may subsequently use direct memory access (DMA) to fetch the target page from system memory 28 via the dedicated interface.

At block 270, a determination is made regarding whether another target page is to be added to the ACQ. Based on a determination that another target page is to be added to the ACQ, the process 200 may access the page map to determine the location of the new target page, as shown in block 220. However, based on a determination that no more target pages are to be added to the ACQ, the I/O responses are collected as shown in block 280. According to an embodiment, the I/O responses may include messages that the disk storage 34 sends back to the requesting server along with the data that was requested. The I/O responses may be implemented with an interrupt driven scheme, wherein the processor 16 in the server is interrupted by the incoming message and branches to an I/O interrupt handler. The code in that handler matches the I/O response to the initial requestor, thus ensuring that the data is delivered to the correct memory location and updating a control block in memory to indicate to that the I/O request is complete. The same interrupt handler may be utilized every time another I/O interrupt comes into the server with the next chunk of data.

Figure 3:
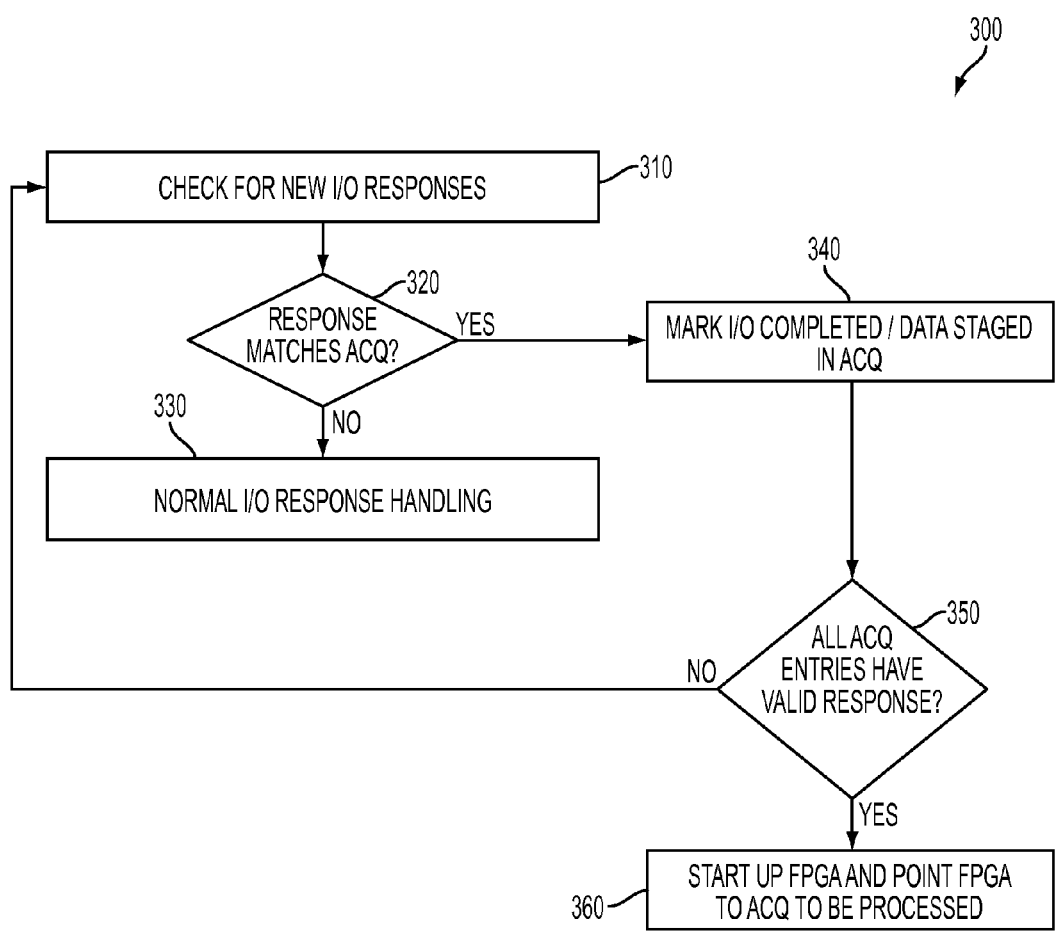
FIG. 3 depicts a flow diagram for initiating an accelerator to process data from an accelerator control queue according to an embodiment.

With reference to FIG. 3, a flow diagram of a process 300 performed by an embodiment of the processor 16 of the computer system 10 is generally shown. As shown in FIG. 3, the process 300 provides a method for initiating an accelerator 52 to process data from the ACQ according to an embodiment.

At block 310, the process 300 checks for new I/O responses to a data request or query. At block 320, a determination is made regarding whether the new I/O response matches an entry in the ACQ according to an embodiment.

Based on a determination that the new I/O response does not match an entry in the ACQ, the new I/O response is handled according to contemporary handling methods, as shown in block 330. However, based on a determination that the new I/O response matches an entry in the ACQ, the new I/O response is marked as completed, as shown in block 340. In other words, the new I/O response is marked as having been pre-staged in the ACQ according to an embodiment.

At block 350, a determination is made regarding whether all entries in the ACQ have valid responses. According to an embodiment, each ACQ entry may include a set of bits that indicate the state of I/O operations for the ACQ entry. These bits may be used to confirm that enough disk operations have been completed and that the required data has been staged in a faster special pre-stage buffer memory before invoking the accelerator 52. The special pre-stage buffer 36, 54, 62 is configured to pre-stage the target data for access by an accelerator according to an embodiment. According to an embodiment, the server collects the I/O responses and then waits to send the ACQ to an accelerator 52. According to another embodiment, the server may send an ACQ to an accelerator 52 that has several entries marked as valid but some marked as invalid. Accordingly, the accelerator 52 would start working with the valid blocks of data and then later query the server for an updated version of the ACQ wherein the previously invalid entries have become valid. According to another embodiment, the accelerator 52 may monitor the I/O interrupt messages itself.

Accordingly, based on a determination that all the ACQ entries have a valid response, the accelerator 52 is actuated and pointed to the ACQ as shown in block 360. According to an embodiment, the accelerator 52 uses the information in the ACQ to sequence data accesses in an optimal way to maximize the data throughput of the accelerator 52 and avoid waiting on disk accesses. Otherwise, based on a determination that valid responses remain to additional ACQ entries, the process 300 checks for new I/O responses to the data request or query, as shown in block 310.

Figure 4:
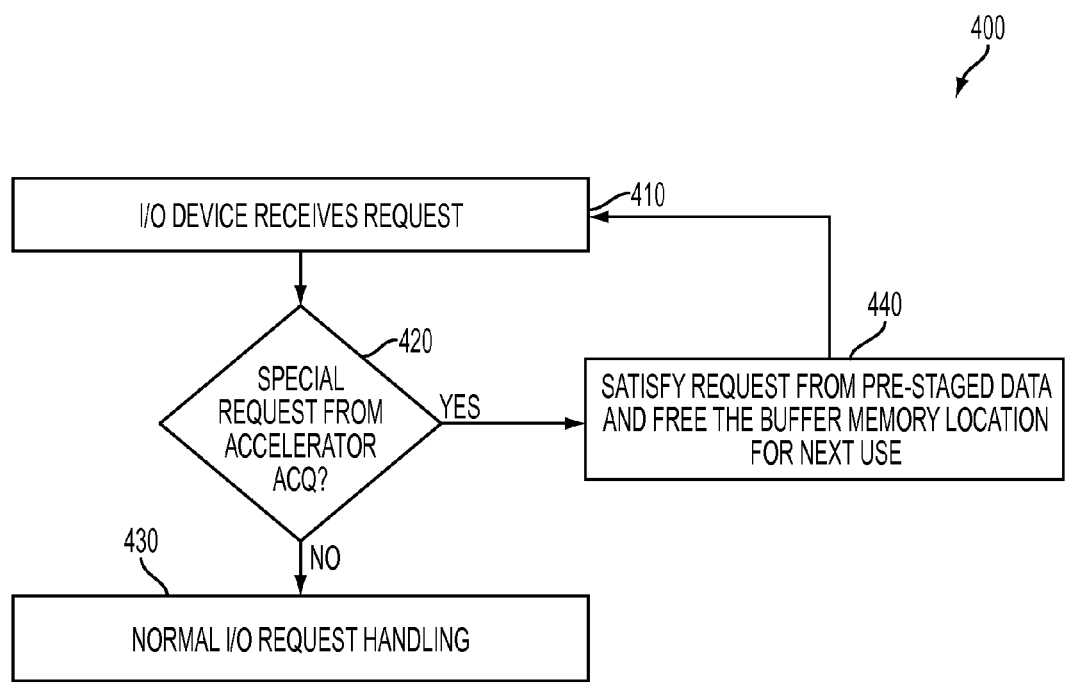
FIG. 4 depicts a flow diagram for freeing pre-staged data from a special pre-stage buffer memory location according to an embodiment.

With reference to FIG. 4, a flow diagram of a process 400 performed by an embodiment of the processor 16 of the computer system 10 is generally shown. As shown in FIG. 4, the process 400 provides a method for freeing pre-staged data from a special pre-stage buffer memory location according to an embodiment.

At block 410, an I/O device, such as disk storage 34, may receive a request for target data. A determination is made regarding whether the received request is a special request at block 420. Based on the received request being a normal request, the request is handled according to contemporary handling methods, as shown in block 430. Based on the received request being a special I/O request, an embodiment may temporarily mark the requested page of data as unavailable for update by any other requestor. Accordingly, the special request is fulfilled by the accelerator 52 with pre-staged data and the special pre-stage buffer memory location of the pre-staged data is released for subsequent use, as shown in block 440. In other words, according to an embodiment, the mapped target page and pages marked as unavailable for update may be released after the accelerator 52 as finished accessing the required data.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 5:
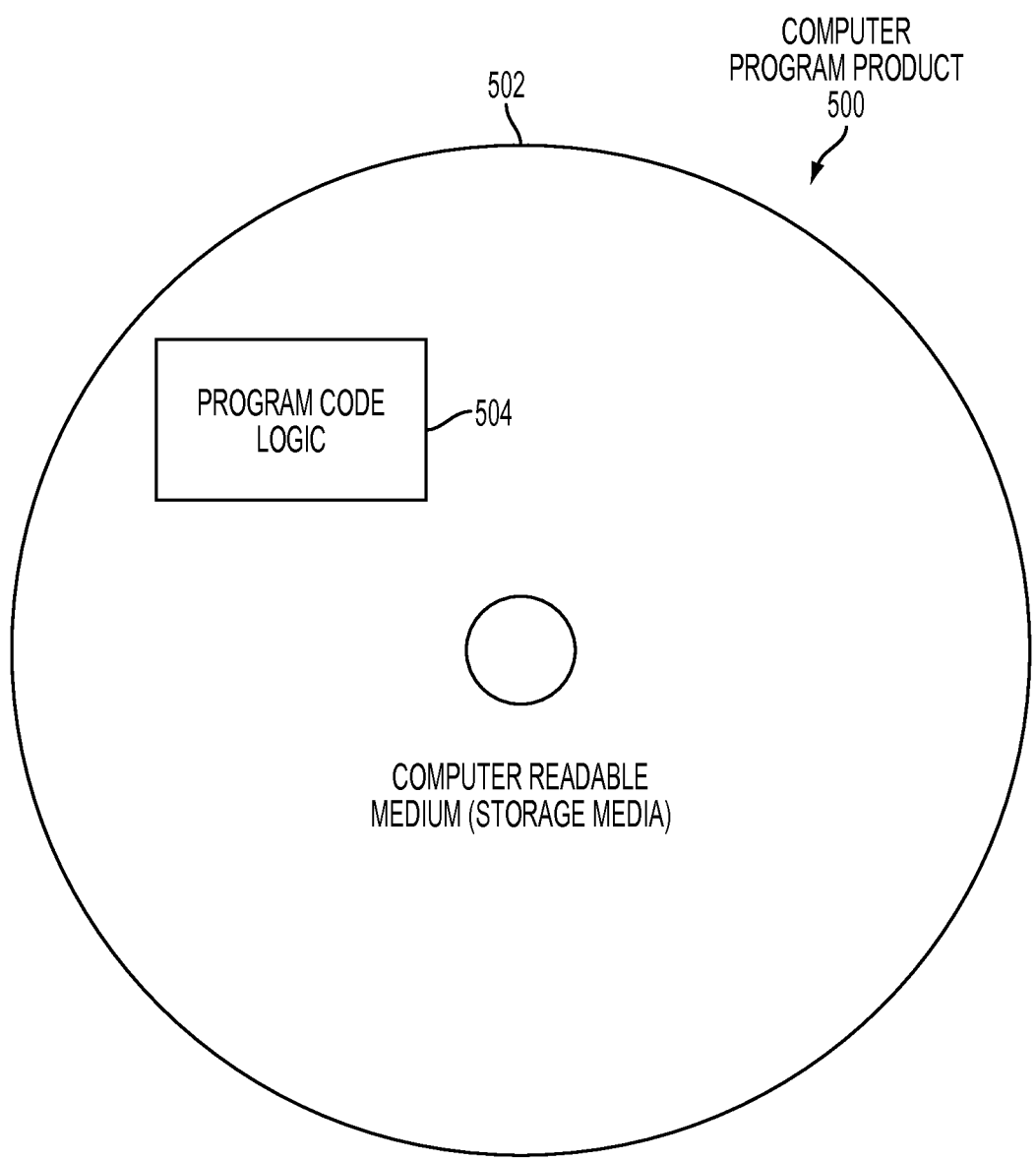
FIG. 5 depicts a computer program product in accordance with an embodiment.

Referring now to FIG. 5, in one example, a computer program product 500 includes, for instance, one or more storage media 502, wherein the media may be tangible and/or non-transitory, to store computer readable program code means or logic 504 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Technical effects and benefits include providing the ability to run queries and other algorithms against the most recent real time data in an OLTP system, even when a fraction of the data that needs to be accessed resides on slow disk storage 34. Moreover, disclosed embodiments minimize the data bandwidth required to move data from disk storage 34 to system memory 28 and then from system memory 28 to the accelerator 52. Embodiments disclose provide efficient utilization of the accelerators 52 that need to access data from sources having differing access latencies and response times.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for providing high throughput hardware acceleration, comprising:
   initializing, by a computer, an accelerator control queue (ACQ) configured to provide location information on a plurality of pages of data identified as accelerator data;
   receiving a request for a target data from a software application, the target data spanning a plurality of pages;
   determining an originating location of each page of the target data, the originating location comprising at least one of a system memory and a disk storage;
   based on determining that the originating location is the system memory, creating an entry in the ACQ that maps to a system memory source address for the target data;
   based on determining that the originating location is the disk storage, creating an entry in the ACQ that maps to a pre-stage buffer source address of special pre-stage buffers for the target data, the special pre-stage buffers configured to pre-stage the target data from the disk storage for access by accelerators;
   wherein the special pre-stage buffers include accelerator buffers; and
   accessing, by the accelerators, each page of the plurality of pages of the target data from respective locations in the system memory or the special pre-stage buffers, based on respective entries of the ACQ;
   wherein the accelerators each comprise one of the special pre-stage buffers;
   wherein the accelerators are connected to the system memory and the disk storage by an I/O network, the system memory and the disk storage both being external to the accelerators;
   wherein at least one of the accelerators is connected to the system memory by a dedicated interface separate from the I/O network; and
   wherein another one of the accelerators is separately connected to an additional special pre-stage buffer.

2. The computer-implemented method of claim 1, wherein further based on determining that the originating location is the disk storage:
   initiating a special input/output request to store the target data in the special pre-stage buffers; and
   saving the source address of the special pre-stage buffers where the target data is stored.

3. The computer-implemented method of claim 2, wherein the special pre-stage buffers comprise a buffer coupled to a memory card.

4. The computer-implemented method of claim 1, wherein the entry in the ACQ further comprises an indication that the target data resides in at least one of the system memory, the disk storage, and the pre-stage special buffers, and a state of input/output operations for the target data.

5. The computer-implemented method of claim 1, further comprising:
   checking for an input/output response from a subsequent data request;
   determining that the input/output response matches an entry in the ACQ; and
   marking the input/output response as being in the ACQ based on matching the input/output response to an entry in the ACQ;
   determining that all entries in the ACQ have valid responses prior to initializing the accelerators.

6. The computer-implemented method of claim 1, wherein based on a determination that the target data originated from the disk storage, the method further comprises:
   marking the target data as unavailable for update by another requestor;
   transmitting the target data to the accelerators for processing; and
   releasing the pre-stage buffer source address for the target data after the accelerators have finished accessing the target data.

7. A computer program product for implementing high throughput hardware acceleration, the computer program product comprising:
   a non-transitory storage medium readable by a processing circuit and storing instructions for execution by the processing circuit for performing a method comprising:
   initializing, by a processor, an accelerator control queue (ACQ) configured to provide location information on a plurality of pages of data identified as accelerator data;
   receiving a request for a target data from a software application, the target data spanning a plurality of pages;
   determining an originating location of each page of the target data, the originating location comprising at least one of a system memory and a disk storage;
   based on determining that the originating location is the system memory, creating an entry in the ACQ that maps to a system memory source address for the target data;
   based on determining that the originating location is the disk storage, creating an entry in the ACQ that maps to pre-stage buffer source address of special pre-stage buffers for the target data, the special pre-stage buffers configured to pre-stage the target data from the disk storage for access by accelerators;
   wherein the special pre-stage buffers include accelerator buffers; and
   accessing, by the accelerators, each page of the plurality of pages of the target data from respective locations in the memory or the special pre-stage buffers, based on respective entries of the ACQ;

wherein the accelerators each comprise one of the special pre-stage buffers;

wherein the accelerators are connected to the system memory and the disk storage by an I/O network, the system memory and the disk storage both being external to the accelerators;

wherein at least one of the accelerators is connected to the system memory by a dedicated interface separate from the I/O network; and wherein another one of the accelerators is separately connected to an additional special pre-stage buffer.

8. The computer program product of claim 7, wherein further based on determining that the originating location is the disk storage:

initiating a special input/output request to store the target data in the special pre-stage buffers; and saving the source address of the special pre-stage buffers where the target data is stored.

9. The computer program product of claim 8, wherein the special pre-stage buffers comprise a buffer coupled to a memory card.

10. The computer program product of claim 7, wherein the entry in the ACQ further comprises an indication that the target data resides in at least one of the system memory, the disk storage, and the pre-stage special buffers, and a state of input/output operations for the target data.

11. The computer program product of claim 7, wherein based on the target data originating from the system memory, the initializing of the accelerators further comprises transmitting the system memory mapped target data to the accelerators via the dedicated interface.

12. The computer program product of claim 7, wherein the method further comprises:

checking for an input/output response from a subsequent data request;

determining that the input/output response matches an entry in the ACQ; and marking the input/output response as being in the ACQ based on matching the input/output response to an entry in the ACQ.

13. The computer program product of claim 12, further comprising determining that all entries in the ACQ have valid responses prior to initializing the accelerators.

14. The computer program product of claim 7, wherein based on a determination that the target data originated from the disk storage, the method further comprises:

marking the target data as unavailable for update by another requestor;

transmitting the target data to the accelerators for processing; and releasing the pre-stage buffer source address for the target data after the accelerators have finished accessing the target data.

15. A computer system configured to implement high throughput hardware acceleration, the system comprising:

a processor and a memory, the system configured to perform a method comprising:

initializing, by a processor, an accelerator control queue (ACQ) configured to provide location information on a plurality of pages of data identified as accelerator data;

receiving a request for a target data from a software application, the target data spanning a plurality of pages;

determining an originating location of each page of the target data, the originating location comprising at least one of a system memory and a disk storage;

based on determining that the originating location is the system memory, creating an entry in the ACQ that maps to a system memory source address for the target data;

based on determining that the originating location is the disk storage, creating an entry in the ACQ that maps to a pre-stage buffer source address of special pre-stage buffers for the target data, the special pre-stage buffers configured to pre-stage the target data from the disk storage for access by the accelerators;

wherein the special pre-stage buffers includes accelerator buffers; and accessing, by the accelerators, each page of the plurality of pages of the target data from respective locations in the system memory or the special pre-stage buffers, based on respective entries of the ACQ;

wherein the accelerators each comprise one of the special pre-stage buffers;

wherein the accelerators are connected to the system memory and the disk storage by an I/O network, the system memory and the disk storage both being external to the accelerators;

wherein at least one of the accelerators is connected to the system memory by a dedicated interface separate from the I/O network;

wherein another one of the accelerators is separately connected to an additional special pre-stage buffer.

16. The computer system of claim 15, wherein further based on determining that the originating location is the disk storage:

initiating a special input/output request to store the target data in the special pre-stage buffer; and saving the source address of the special pre-stage buffers where the target data is stored.

17. The computer system of claim 15, wherein the entry in the ACQ further comprises an indication that the target data resides in at least one of the system memory, the disk storage, and the pre-stage special buffers, and a state of input/output operations for the target data.

18. The computer system of claim 15, wherein the method further comprises:

checking for an input/output response from a subsequent data request;

determining that the input/output response matches an entry in the ACQ; and marking the input/output response as being in the ACQ based on matching the input/output response to an entry in the ACQ.

19. The computer system of claim 18, further comprising determining that all entries in the ACQ have valid responses prior to initializing the accelerators.

* * * * *